No. 724,718. PATENTED APR. 7, 1903.
F. LAMBERT.
WATER METER.
APPLICATION FILED APR. 28, 1902.
NO MODEL.

Attest:
Geo H Botts
Mabelle F. Lake

Inventor:
Frank Lambert
By Edith J. Griswold
Atty.

UNITED STATES PATENT OFFICE.

FRANK LAMBERT, OF BROOKLYN, NEW YORK.

WATER-METER.

SPECIFICATION forming part of Letters Patent No. 724,718, dated April 7, 1903.

Application filed April 28, 1902. Serial No. 105,062. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and more particularly to meters having an external-pressure casing with a measuring-chamber mounted in the casing, but adapted to be moved out of normal position to prevent distortion or bursting from expansion of the contents due to freezing or from any other cause of supernormal internal pressure.

The object of the present invention is to provide a simple means for permitting the measuring-chamber to be thus moved out of normal position.

The accompanying drawings represent a meter having a device made according to my invention applied thereto; but it is to be understood that I do not limit my invention to the particular construction shown.

Figure 1:
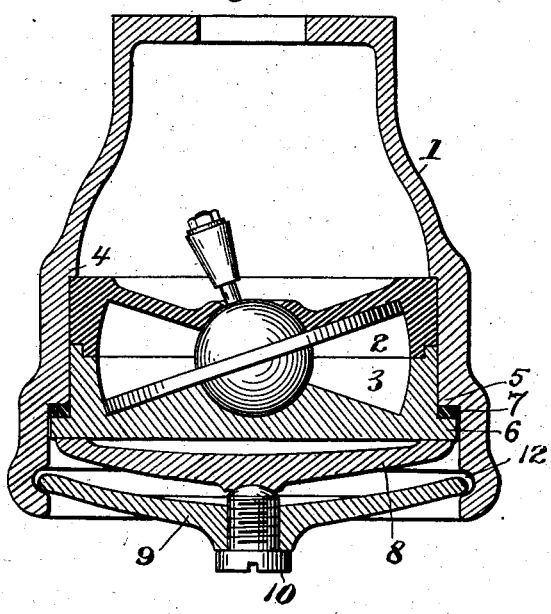
Figure 2:
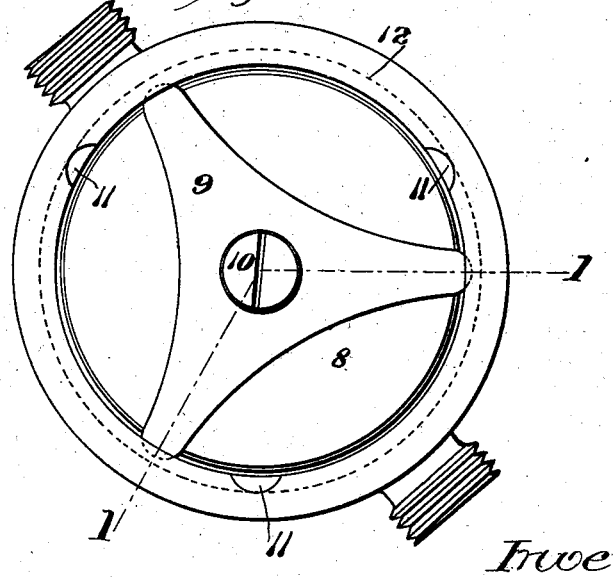

Figure 1 is a central sectional elevation of so much of a meter as is necessary to illustrate the principle of my invention, the lower part of the casing and parts contained therein being shown as if taken on the broken line 1 1 of Fig. 2 for clearness. Fig. 2 is a bottom plan view.

The generic construction and operation of meters of the kind here shown are so well known that a description thereof is omitted.

Referring to the drawings, the external casing 1 is formed with an opening for the admission of the measuring-chamber, which may be formed of any number of sections, the construction shown having two sections 2 and 3. This measuring-chamber is closely but freely fitted in the bored portion of the casing 1 and is stopped in normal position therein by coming against a shoulder 4 in the casing.

The measuring-chamber 2 3 closes the opening in the casing 1, and a water-tight joint is made by interposing between a shoulder 5 on the casing and a flange 6 on section 3 of the measuring-chamber a gasket or packing 7.

The support for maintaining the chamber and casing in normal relative position and the joint 5 6 7 water-tight is here shown as consisting of a round plate 8, which may be of cast-iron, a steel spring 9, and a screw 10, threaded in the said spring.

In assembling the parts of the meter after the measuring-chamber has been pushed into its seat in the casing the plate 8 is placed in the opening of the casing below the chamber and the outer ends of the arms of spring 9 are passed through slots 11, Fig. 2, into a circular groove 12 in the casing and turned so that its arms are held in the groove 12. Then by screwing up screw 10 against the plate 8 the said plate is centered and brought to bear against the measuring-chamber to maintain it in normal position.

The resiliency of the spring-plate 9 is calculated to withstand a predetermined internal pressure of the meter without giving; but when the internal pressure exceeds the predetermined amount, and therefore the force exerted upon the center of the spring through the measuring-chamber, plate 8, and screw 10 reaches a certain degree, the spring 9 will give and jump out of or escape from its bearing in the casing, and thus relieve the spring tension that holds the parts together.

The plate 8 is not essential, as the screw may be made to bear directly against the measuring-chamber. Moreover, various other devices for holding the chamber in the casing by spring tension adapted to be relieved by undue internal pressure may be adopted without departing from my invention, the construction herein shown being merely by way of example to illustrate the principle of my invention.

I claim as my invention—

1. In a water-meter, a casing and a measuring-chamber mounted therein, in combination with a spring-support for holding said measuring-chamber in place under a given predetermined pressure, but adapted to spring out of its supporting position under a pressure greater than said given pressure.

2. In a water-meter, a casing and a measuring-chamber mounted therein, in combination with a spring-plate bearing in said casing and holding said measuring-chamber in place under a predetermined pressure, but adapted to escape from the bearing under a pressure greater than said given pressure.

In testimony whereof I have signed my name to this specification in the presence of two subscribing witnesses.

FRANK LAMBERT.

Witnesses:
EDITH J. GRISWOLD,
MABELLE F. LAKE.